Figure 1:
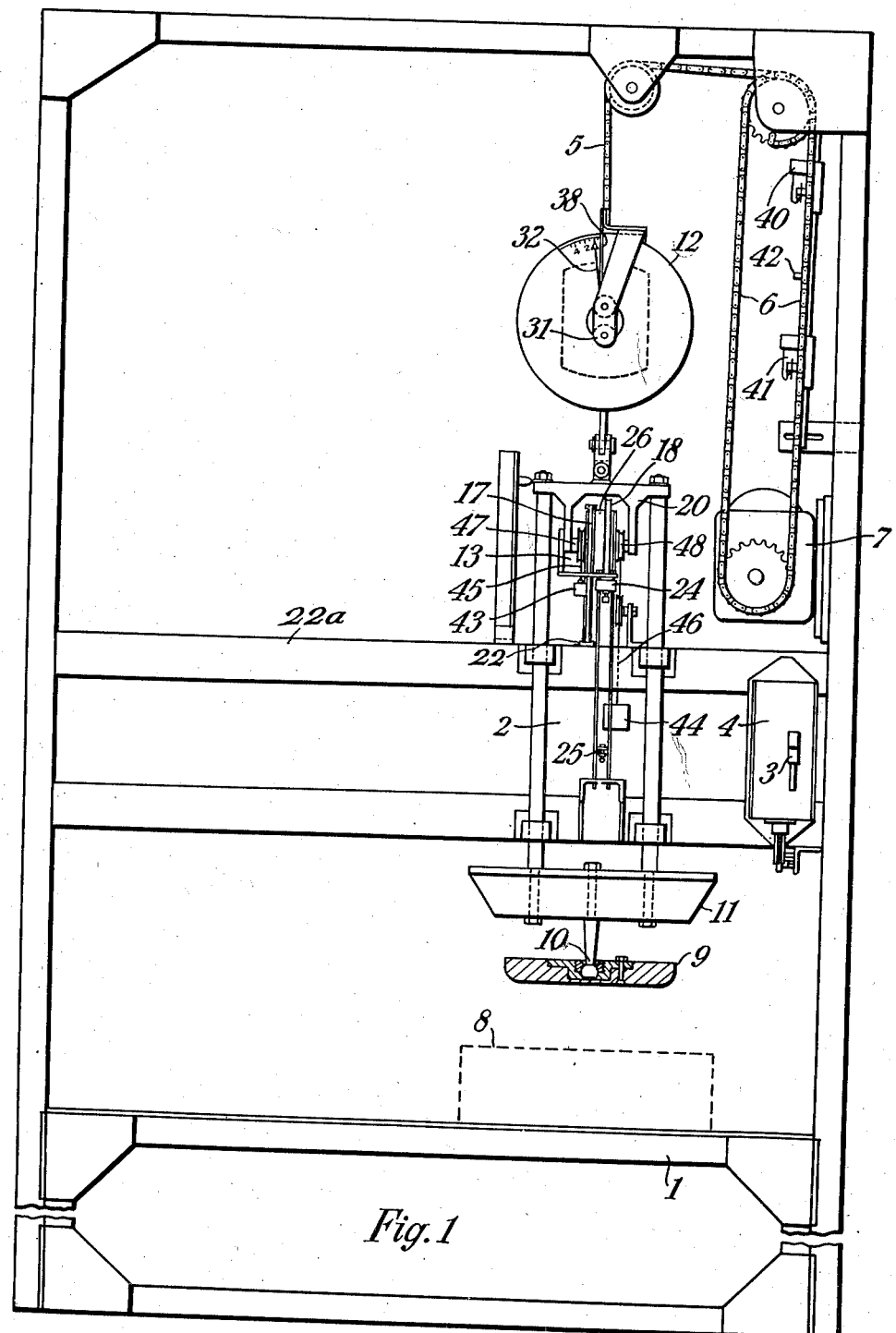

May 2, 1939.  E. SIMPSON ET AL  2,156,877
COMPRESSION TESTING APPARATUS
Filed Sept. 28, 1937  5 Sheets-Sheet 1

May 2, 1939.  E. SIMPSON ET AL  2,156,877
COMPRESSION TESTING APPARATUS
Filed Sept. 28, 1937  5 Sheets-Sheet 4

Inventors:
Edward Simpson
Arthur James Stubbs
Thomas Norcross
by Chima & Rauber
their attorneys May 2, 1939.  E. SIMPSON ET AL  2,156,877

COMPRESSION TESTING APPARATUS

Filed Sept. 28, 1937  5 Sheets-Sheet 5

Patented May 2, 1939

2,156,877

UNITED STATES PATENT OFFICE 2,156,877

COMPRESSION TESTING APPARATUS

Edward Simpson, Erdington, Birmingham, Arthur James Stubbs, Sheldon, Birmingham, and Thomas Norcross, Erdington, Birmingham, England, assignors to Dunlop Tire and Rubber Corporation, Buffalo, N. Y., a corporation of New York Application September 28, 1937, Serial No. 166,056
In Great Britain August 28, 1936

11 Claims. (Cl. 265—12)

In our invention, an article to be tested, such as a cushion, is subjected to a small initial load, as for example two kilograms and its thickness under this load is taken as the datum or zero line. A sufficient load is put onto the cushion to reduce its thickness by a predetermined proportion, for example 40%, of its original thickness and the load required for this compression is then measured. Articles of different thickness may all be reduced to a proportional percentage of their original thickness or their thickness at the initial or datum load. For example, a cushion having a thickness of ten inches would be reduced to a thickness of six inches, while one of five inches initial thickness would be reduced to three inches under the same conditions. The invention, therefore, provides means whereby the original or datum thickness may be measured and whereby the reduction thickness may be limited by a suitable proportioning device, in accordance with the original thickness.

Preferably, the load is imposed by a floating or suspended weight, which is gradually lowered onto the cushion. As the cushion is compressed, it supports an increasing proportion of the weight and accordingly reduces the tension on the lowering mechanism, which has mechanism for measuring this tension. When the initial or datum tension of say two kilograms is reached, a moving control element is lowered with the lowering of the weight, but through a suitable proportioning or speed multiplying mechanism it moves at a more rapid rate, so that it falls the full thickness of the pillow while the weight is moving through 40% of this thickness. Thereupon, it operates an indicating device showing the load at this point. Thereafter the weight may be returned to its original position. Inasmuch as the movement of the measuring mechanism is in a definite relation to and larger than the movement of the weight, it can be arranged to move through a distance equal to the pillow or other test piece no matter what the latter may be when the compressing weight is lowered 40% of that distance. Suitable means are also provided to return the mechanism to its original position.

The various features of the invention are illustrated in the accompanying drawings, in which—

Figure 2:
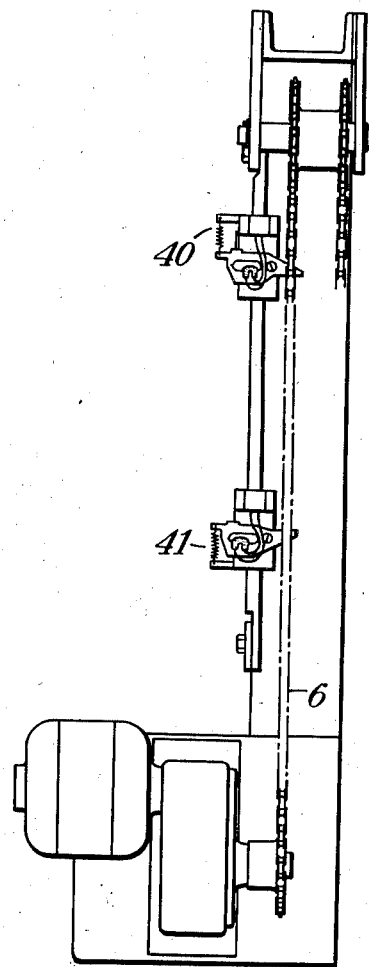
Figure 2:
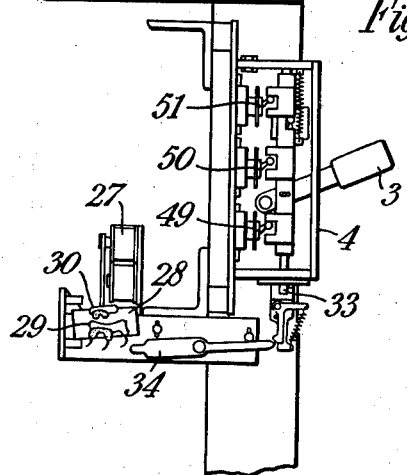
Figure 3:
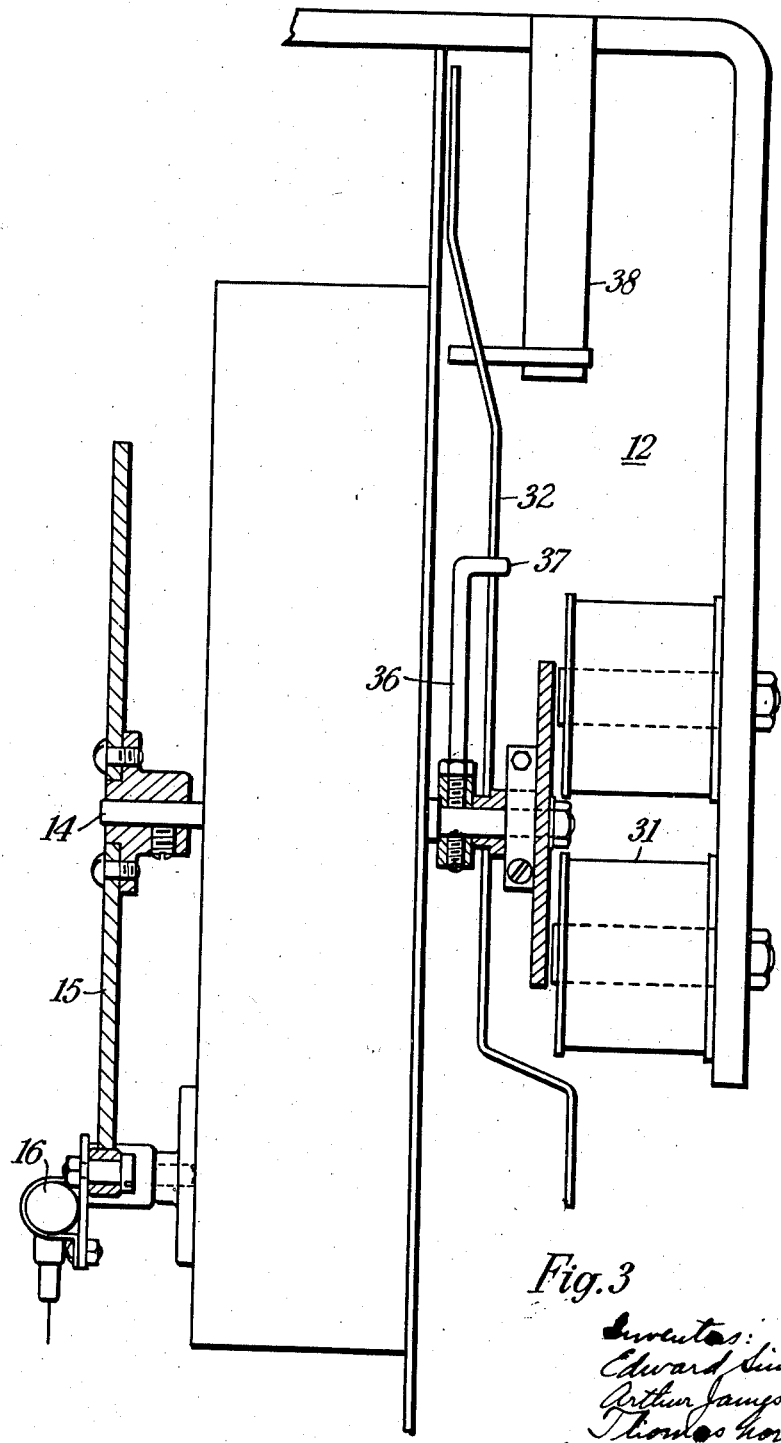
Figure 5:
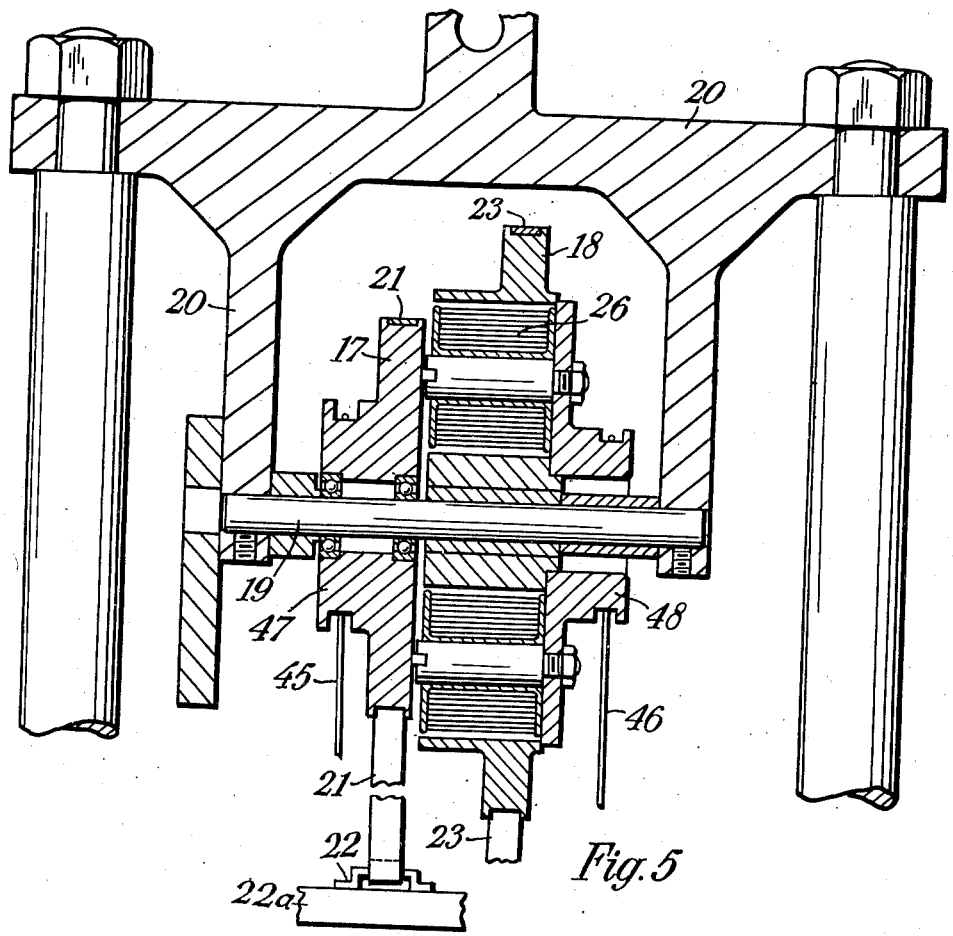
Figure 4:
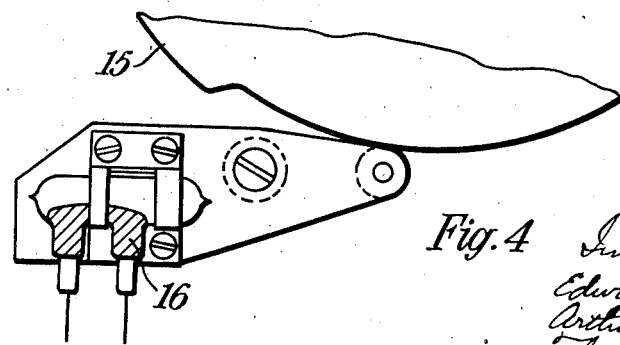
Figure 6:
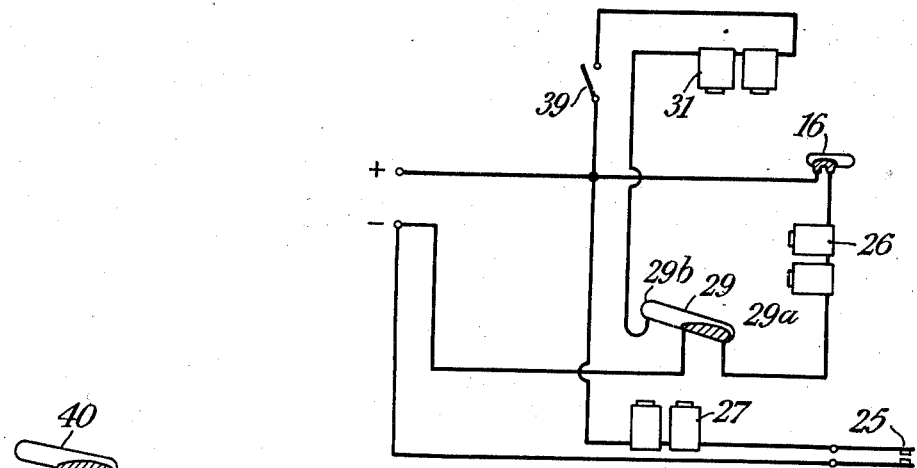
Figure 7:
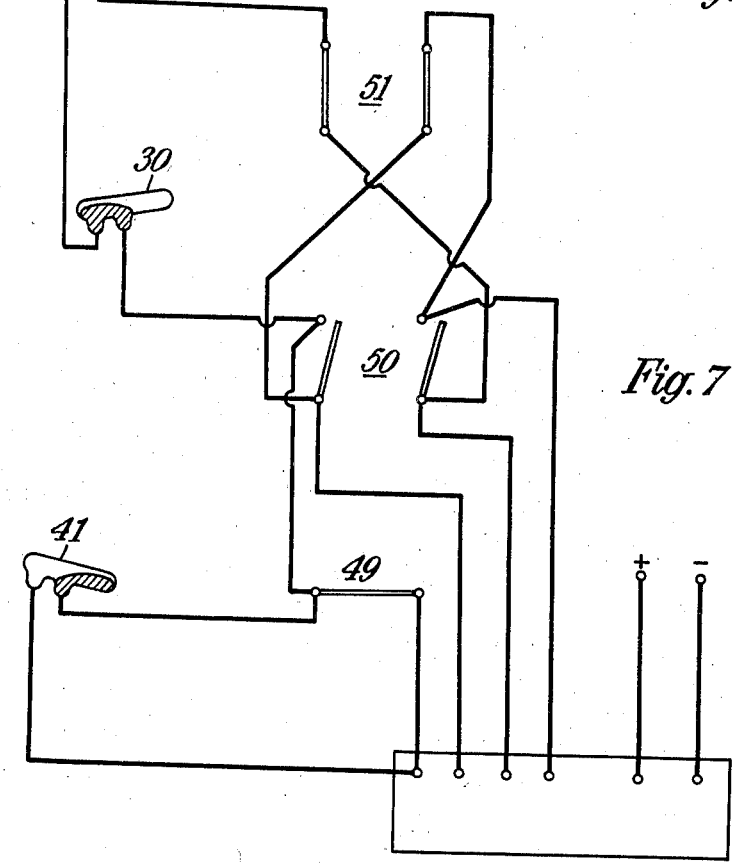

Fig. 1 is a front elevation of the preferred form of apparatus embodying the invention; Fig. 2 is an end view of part of Fig. 1; Fig. 3 is a detail end view of part of the mechanism; Fig. 4 is a front view of part of Fig. 3; Fig. 5 is a detail cross-sectional view of another part of the mechanism; Fig. 6 is a circuit diagram of the testing circuit; Fig. 7 is a circuit diagram of the motor circuit.

Assuming that a test has just been finished and a cushion is in compression on testing platform 1, and that testing unit 2 is stationary, its lowering having been automatically stopped upon the attainment of the desired depression, switch handle 3 of the motor control switch box 4 is now lifted to initiate the raising of the testing unit. The latter hangs from overhead chain 5 connected by chain gearing 6 to a reversing electric motor 7 responsible for raising and lowering said testing unit.

The tested cushion is then removed and a further cushion 8 is positioned on the testing platform 1 immediately beneath a platen 9, which may be universally mounted, as shown at 10, attached to the lowermost part of the testing unit. Disposed above this platen, there is a weight 11 which, together with the other parts of the testing unit, is sufficiently heavy to be capable of submitting the cushion to the requisite load.

The cushion to be tested being in position, switch handle 3 is depressed and motor 7 starts to lower the testing unit. This proceeds until platen 9 contacts the cushion, which then, of course, begins to support a certain amount of the hanging weight bearing upon it.

At the top of the testing unit, there is a dynamometer 12, so calibrated that, when the whole weight of the unit is hanging freely upon it, said dynamometer is indicating an agreed zero, thus, as the cushion begins to support the lowering weight, the pointer of the dynamometer will move round and indicate the amount of weight which the cushion is supporting.

When this has proceeded until the dynamometer is registering the initial load required, for example two kilograms, an electrical contact, hereinafter called the datum contact, is made which puts into action a mechanism 13, hereinafter referred to as a differential, which moves a contact at an increased rate starting, from a position corresponding to the thickness of the cushion under two kilogram's load, said position having been arrived at automatically upon the attainment of said load.

The electrical circuits, herein called the testing and the motor circuits, and which respectively include said datum contact and the motor control switch box aforesaid, will be described later with reference to Figs. 6 and 7, respectively.

The mechanism associated with said datum contact comprises, fixed to the rear end of dynamometer spindle 14, a cam 15, which, when said dynamometer has registered the two kilograms datum, tilts a mercury switch 16 (Figs. 3 and 4) which controls a form of differential 13, as hereinafter explained.

In its preferred form, said differential comprises a pair of pulleys 17 and 18, Figs. 1 and 5, the respective diameters of which are in the proportion of 4 to 6, the circumference of the smaller pulley 17, herein called the driver, being sufficiently great to accommodate the thickest cushion to be tested. These pulleys are arranged as follows:

Both are carried by a spindle 19, Fig. 5, mounted on a carriage 20, which rises and falls with the testing unit, the differential as a whole moving bodily with said unit.

The smaller pulley, i. e., the driver, is encircled by a tape 21, of which one end is attached to a fixed anchorage 22 on the external framework 22a of the apparatus, and the other end to the periphery of said driver, thus, as the testing unit, together with the differential, moves up and down, the driver is caused to rotate by the unwinding of its encircling tape 21.

Encircling the larger pulley 18, herein called the selector, there is another tape 23 and of this one end is fixed to the periphery of said selector and the other end carries a weight 24, Fig. 1, hereinafter called the contact weight.

The tape 23 is unwound by rotation of the selector 18, effected, not by the linear movement of the carriage directly, but by the rotary movement of the driver 17 at the appropriate time, viz. after the dynamometer 12 has registered the two kilograms datum load aforesaid.

Of these respective tapes 21 and 23, that on the driver 17 is for the purpose of transmitting rotation thereto from the linearly moving testing unit, said driver ultimately driving the selector as hereinafter described, while the tape 23 on said selector is for the purpose of operating, by means of the contact weight 24, which it carries, a suitable switch 25, Figs. 1 and 6, hereinafter called the contact switch, as also to be hereinafter described.

When the datum load is reached on the dynamometer the latter, as already explained, makes the datum contact by tilting switch 16 and this energizes electro-magnet 26, Figs. 1, 5 and 6, disposed within differential 13, the effect being to clutch selector 18 to driver 17. Thus, as the testing unit lowers, driver 17 rotates under the influence of its tape 21, and transmits its rotation to selector 18, which thereupon begins to pay out or unreel its tape 23.

To the end of this latter tape is attached the contact weight 24 aforesaid, which, as said tape 23 unwinds, is progressed downwardly towards contact switch 25, which is disposed in a fixed position immediately beneath said contact weight.

Thus, as the testing unit lowers, the gap between weight 24 and contact switch 25 is gradually diminishing, in two ways of which the significance will be explained later, viz., by the bodily movement of the hole differential 13 with the testing unit 2 as a whole and by the paying out of the tape 23 around the selector 18.

Prior to the energizing of magnet 26, this gap is at any position exactly the same as the gap between platen 9 and platform 1, on which the cushion rests, so that at the time when the differential is put into effective operation, the gap between contact weight 24 and contact switch 25 is of necessity the same as the thickness of the cushion under its initial compression.

This spacing is arrived at by reason of the fact that contact weight 24 does not start to move independently of carriage 20 until the dynamometer has registered its two kilograms, thus said contact weight always starts its independent, or proportionally different, movement from a position spaced away from the fixed contact switch below it, a distance exactly similar to the thickness of the cushion under its initial compression.

In other words, in this way the apparatus measures, by the spacing of contact weight 24 and contact switch 25 at the two kilograms load point, said initially compressed thickness. All that now remains to be done is to measure or select 40% of that distance for further depression and establish the load at that point, this is done as follows:

The testing unit as a whole, carrying with it the differential as a whole, is lowering, so that the contact weight, by virtue of this bodily movement, approaches the contact switch by the same amount as the testing unit approaches the platform on which the cushion rests.

Now, for the purpose of arriving at the desired 40% compression selection, it is necessary to increase the travel of the contact weight to such an extent that, while the unit as a whole moves down a distance equal to 40% compression, the contact weight travels the complete distance to the contact switch, that is a distance equal to the thickness of the cushion at two kliograms load.

This is done as follows:

The bodily movement of the unit as a whole accounts for 40% of the movement of the contact weight, the remaining 60% of the movement of said weight being due to the unwinding of tape 23 from selector 18 after said selector is connected to driver 17 by magnet 26, the diameters and, therefore, the circumferences of the driver and selector, respectively, being in the proportion of 4 to 6.

Thus, if the cushion is 10″ thick at two kilograms compression, the further bodily movement for 40% compression will be 4″, but the contact weight will move down a further 6″ due to unwinding of tape 23 from the selector, thus completing 10″ movement in all and so reaching the contact switch at the same moment as the unit attains 40% compression of the cushion. And because of this 4:6 ratio similar effects apply to cushions of any thickness.

So much for the manner in which the differential operates. We will now explain what happens when the moving contact weight 24 meets the fixed contact switch 25 and closes the same.

Referring to the diagram Fig. 6, when the initial load is reached circuit is made from positive main to the electromagnet 27 and thence switch 25 to the negative main. The energization of the electro-magnet 27 will tilt a switch panel 28, Fig. 2, so as to close switches 29 and 30.

One of these switches 29 makes an electrical circuit to energize an electro-magnet 31 behind the pointer 32 of the dynamometer to stop said pointer and hold it in the position at which it has arrived; this pointer as will be hereinafter explained is only frictionally fixed to the spindle 14 of the dynamometer 12.

In that way, we register the reaction load of the cushion, that is the amount of the weight of the testing unit which the cushion is supporting, at the 40% depression point.

This tilting of switch 29 also breaks the circuit of electro-magnet 26 controlling the differential mechanism to de-clutch the pulleys thereof so that said mechanism is again in a condition from which it can be automatically re-set for repeat operation, as hereinafter described.

The other switch 30 is in the motor circuit and as the panel 28 tilts, said switch stops the motor which has been lowering the testing unit and this finishes the operative part of the test.

The cushion is now held between testing platform 1 and platen 9, in the position from which this account of the operation commenced. Switch handle 3 is then lifted to reverse motor 7 and raise the testing unit so that other tests can be made as desired.

Panel 28 is re-set as the switch handle 3 is depressed to start downward travel of the testing unit, said handle displacing control rod 33 to rock lever 34 and thereby tilt said panel 28 (Fig. 2).

As the upward movement of the testing unit proceeds, following the lifting of switch handle 3, the dynamometer moves back to zero and in this connection it is convenient to refer to the arrangement of the spindle and the pointer of said dynamometer.

Pointer 32 of dynamometer 12 is only frictionally held on the spindle, and behind said pointer there is a short arm 36 having a projection 37 at its end adapted to engage said pointer 32, this arm being fixed rigidly to the spindle of the dynamometer. While the 40% depression is proceeding, this arm and the pointer are moving together, when that depression has been reached the arm is able to proceed in slight further rotation before switch 30 has taken effect to switch off the motor and stop the downward travel of the testing unit. This allows for time lag, between the making of the contact and actual stopping, due to motor over-run and so on.

In the reverse direction, that is to say in the upward travel of the testing unit, the pointer 32 and the arm 36 will again move backward, the arm 36 finally taking up the correct zero, but as the finger is frictionally mounted it must be re-set against the arm at zero. This is done by means of a spring 38 located near the dynamometer zero and adapted to prevent the pointer from over-running said zero.

Operated by handle 3, there is a switch 39, which is opened as said handle is lifted to raise the testing unit, and this de-energizes magnet 31, so that return of the pointer is not effected against the friction imposed by said magnet.

It will be apparent that various other provisions may be made, for example, as follows:

Provision is preferably made to limit the amount of available travel of the testing unit, the same comprising, for example, upper and lower trip switches 40 and 41 operated by a projection 42 on the chain of the hoisting gear, switch 40 stopping downward travel of the testing unit 2, when the same is not stopped by switch 30, and switch 41 stopping upward travel of said unit, if the operator does not reverse the motor via handle 3 previously.

The pulleys 17 and 18 of the differential mechanism are preferably associated with counter-weights 43 and 44 hanging upon cables 45 and 46 passing round flanges 47 and 48 integral with said pulleys. At this point and with reference to these weights and flanges, it is convenient to describe the automatic re-setting of the differential as the unit rises.

The tapes encircling the selector and driver, respectively, rewind thereonto automatically as said rising proceeds. In the case of the selector 18, rewinding is effected by means of the weight 44 hung on the flange 48 thereof, tautening of the selector tape 23 being effected by the contact weight 24 aforesaid. In the case of the driver 17 rewinding is effected by means of the association of the driver tape 21 itself with the driver, the weight 43 hung on the flange 47 of the latter being in this instance provided for the purpose of tautening the driver tape 21.

At this stage, we may usefully refer to the circuit diagrams shown in Figs. 6 and 7, which we have called the testing circuit and the motor circuit, respectively. Although it may involve a little reiteration, we will now describe the operation of these circuits.

Referring to Fig. 6, when the initial load is reached, circuit is made from the mains through switch 16 to magnet 26 and thence through side 29a of switch 29 back again to the mains, magnet 26, of course, being meantime energized to clutch the differential. The next thing is for weight 24 to lower onto and operate switch 25 and thus make circuit from the mains through magnet 27 to energize the same.

The latter, thereupon tilts switch 29 so that circuit to clutch magnet 26 is broken and circuit is made from the mains through side 29b of switch 29 to magnet 31 and thence back to the mains. Breaking of magnet 26 circuit frees the differential, and making of magnet 31 circuit holds the dynamometer pointer at the position at which it has arrived. The test being then complete handle 3 is lifted to raise the testing unit 2 and this brings us to the motor circuit shown in Fig. 7. Before leaving Fig. 6, however, we may mention that lifting of handle 3 opens switch 39, not shown elsewhere, in magnet 31 circuit between said magnet and the mains to break said circuit before lifting proceeds.

Now referring to Fig. 7, which shows the motor circuit. In this diagram, the circuit is shown when platen 9 is at the top and handle 3 has just been depressed to start testing unit 2, lowering, it is assumed that raising of the unit has been stopped by means of switch 41. Depression of handle 3 in this way, (a) puts the three switches 49, 50 and 51 into the position shown in the diagram and so starts motor 7 in a direction of rotation appropriate for lowering the testing unit, (b) tilts panel 28 to re-set switches 29 and 30, and (c) closes switch 39 to re-set magnet 31 circuit. Immediately, the testing unit starts to lower, switch 41 is freed and so resets. If a cushion is being tested lowering is stopped by magnet 27 tilting switch 30 to break the motor circuit. In case of over-running, as when there is no cushion on the testing platform, switch 40 will stop the lowering. To return the testing unit handle 3 is raised. This reverses the position of switches 49, 50 and 51 to start the motor in reverse rotation, appropriate for the raising of the testing unit. It also opens switch 39 to free pointer 32 on the dynamometer dial.

It will of course be apparent that we do not confine ourselves to the details of the above or any particular embodiment of the invention, as for example although the described form of differential is particularly efficient and appropriate to the conditions obtaining, it will be apparent that other forms of mechanism for producing the necessary difference in movement may be utilized.

Again it will be apparent that the various movements and effects referred to are relative between the respective parts with which they are concerned and in certain circumstances the described order may be reversed.

Again instead of the gap between contact weight 24 and contact switch 25 being normally the same as the distance between platen 9 and cushion-supporting platform 1, or the thickness of the initially compressed cushion, said gap may be otherwise suitably proportional thereto.

Again instead of controlling the reversing motor 7 directly through tumbler switches as 49, 50 and 51, said motor may be controlled by equivalent mechanism.

Instead of a motor-driven hoist we may use one driven in any other way. And in general instead of a system of electrical control we may use any other suitable system either mechanical or fluid pressure, or of course a combination of any of these systems.

The dynamometer 12 is preferably of the spring-balance type but it will be apparent that we may use some other suitable form of measuring and registering or the like means.

Instead of fixing pointer 32 as by magnet 31 any other control achieving a like result may be used—for example we may rely on the cessation of the lowering of testing unit 2. Or again we may cause a permanent record to be made—for example magnet 31 may be used to operate a pen or pencil onto a suitable chart.

And finally, although in the embodiment described, travel of the testing unit both ways is started by manual operation of switch handle 3 which selects the appropriate direction of rotation of reversing motor 7, it being the stopping which is effected automatically, alternatively provision may be made to run the apparatus from a power drive in wholly automatic manner—so that the cushions are merely placed on the testing table and removed therefrom, and even this may be done by a suitable system of conveyors.

Having now particularly described and ascertained our said invention, we claim:

1. A compression measuring apparatus which comprises a test piece support, a weighting mass, means for lowering said mass onto said test piece to compress the latter, means for measuring the weight of said mass supported by said test piece as said mass is lowered, control means for marking the weight supported by said mass when compressed to a predetermined proportion of its thickness which comprises a movable member carried by and movable with said mass lowering means, means to lower said movable member relative to said mass lowering means and at a rate proportional to the lowering of the latter, means actuated by the measuring means at a datum supported weight to actuate said movable member lowering means, and means to fix the weight indication when said movable member has reached a limit of movement equal to the thickness of the test piece under said initial datum weight.

2. A compression measuring apparatus which comprises means to lower a mass progressively onto the test piece whereby an increasing proportion of said mass will be supported by said test piece, a wheel carried by said mass lowering means and rotating proportionately to the lowering of said mass, a second wheel carried by said mass lowering means and of larger diameter than said first wheel, means to clutch said wheels to each other when the weight supported by said test piece reaches a predetermined small value, a contact weight supported from said second wheel and lowered when the wheels are clutched and the lowering means is lowered, and means to indicate the weight of said mass supported by said test piece when said contact weight is lowered to a predetermined level.

3. The apparatus of claim 2, in which said wheel clutching mechanisms comprise an electric circuit actuated when a minimum or datum weight is imposed on said test means and said clutch element controlled by said electric circuit.

4. The apparatus of claim 2 and means comprising an electric circuit for holding the weight indicating means in fixed position, and means actuated by the rotation of said larger wheel for controlling said electric circuit.

5. Apparatus for testing the compressibility of articles which comprises a support for an article to be tested, a weighting mass, means for suspending said mass above and for progressively lowering it onto the article to be tested, means to measure and indicate the weight of said mass supported by said article, a pair of wheels rotatable as a unit and of different diameters, means to rotate the smaller wheel with a peripheral speed equal to that of said weight, a contact means suspended from the periphery of said larger wheel to be lowered at its peripheral speed, and means actuated by said contact means for stopping the weight indicator when said contact piece reaches a predetermined level.

6. Means for testing the compressibility of articles which comprises means for supporting the article to be tested, a compressing mass, means for suspending said compressing mass above said article and for progressively lowering it thereon comprising means actuated by said lowering to move at a speed greater than and proportionate to the lowering of said mass, weight indicating means, and means to stop said weight indicating means when said proportionate speed means reaches a predetermined position.

7. Means for testing the compressibility of articles which comprises means for supporting the article to be tested, a compressing mass, means for suspending said compressing mass above said article and for progressively lowering it thereon comprising means actuated by said lowering to move at a speed greater than and proportionate to the lowering of said mass, weight indicating means, means to stop said weight indicating means when said proportionate speed means reaches a predetermined position, and means to limit movement of said mass.

8. Apparatus for testing the compressibility of resilient articles which comprises means for supporting an article to be tested, a compressing mechanism comprising a mass, means to support said mass above said article and to progressively lower it thereon, means for indicating the part of said mass supported by said article in said progressive lowering, an actuating element, means for moving said actuating element at a rate proportional to and greater than the lowering of said mass, and an electric circuit having a switch actuated by said actuating element at a fixed elevation, said circuit comprising electromagnetic means for holding the weight indicator upon the closing of said circuit.

9. Means for testing the compressibility of resilient articles which comprises means for supporting the article to be tested, means movable toward said supporting means to compress said article, means to measure the reaction of said article to said compressing force as said compression progresses, means actuated by a small initial reaction of said article to move toward said support at a speed proportional to and greater than that of said moving compression means, and means to fix the measurement of the reaction pressure of said article when said more rapidly moving means reaches a distance equal to the thickness of said article under said initial small reaction pressure.

10. A compression measuring apparatus which comprises means to support a test piece, a weighting mass, means for suspending said weighting mass above said test piece and lowering it into said test piece whereby increasing proportions of said weight are supported by said test piece, means for measuring and indicating the weight of said weighting mass supported by said test piece, and means to fix the weight indication of said measuring and indicating means when the compression of the test piece reaches a predetermined proportion of its initial thickness and comprising a movable mechanism, means for setting said mechanism in motion relative to said weight lowering means when the weight supported by said test piece equals a small datum amount, and means to fix the weight indication when said movable mechanism reaches a predetermined limit of movement.

11. Apparatus for measuring the compressibility of articles which comprises a support for the article to be tested, a mass, means for suspending and progressively lowering said mass into said article, means movable by said mass lowering means and relative to the said mass at a speed proportionate to the lowering of said mass, and means actuated by said movable means to fix the indication of weight of the mass supported by said article when said movable means reaches a predetermined position.

EDWARD SIMPSON.
ARTHUR JAMES STUBBS.
THOMAS NORCROSS.